United States Patent

Shrivastava et al.

(10) Patent No.: US 8,681,461 B2
(45) Date of Patent: Mar. 25, 2014

(54) SELECTIVE CURRENT PUMPING TO ENHANCE LOW-VOLTAGE ESD CLAMPING USING HIGH VOLTAGE DEVICES

(75) Inventors: Mayank Shrivastava, Unterhaching (DE); Christian Russ, Diedorf (DE); Harald Gossner, Riemerling (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/429,577

(22) Filed: Mar. 26, 2012

(65) Prior Publication Data

US 2013/0250461 A1    Sep. 26, 2013

(51) Int. Cl.
H02H 3/22    (2006.01)

(52) U.S. Cl.
USPC .............................. 361/56; 361/111

(58) Field of Classification Search
USPC ................................... 361/56, 111
See application file for complete search history.

(56) References Cited

U.S. PATENT DOCUMENTS

| | | | |
|---|---|---|---|
| 6,066,879 A | 5/2000 | Lee et al. | |
| 6,071,768 A | 6/2000 | Duvvury et al. | |
| 6,140,683 A | 10/2000 | Duvvury et al. | |
| 6,147,538 A | 11/2000 | Andresen et al. | |
| 6,411,480 B1 * | 6/2002 | Gauthier et al. | 361/56 |
| 6,624,487 B1 | 9/2003 | Kunz et al. | |
| 6,661,273 B1 | 12/2003 | Lai et al. | |
| 6,804,095 B2 | 10/2004 | Kunz et al. | |
| 6,900,969 B2 | 5/2005 | Salling et al. | |
| 6,933,567 B2 | 8/2005 | Duvvury et al. | |
| 7,245,466 B2 | 7/2007 | Steinhoff | |
| 7,295,411 B2 * | 11/2007 | Arai et al. | 361/56 |
| 7,633,731 B1 | 12/2009 | So | |
| 7,838,924 B2 | 11/2010 | Boselli et al. | |
| 7,872,840 B1 | 1/2011 | Vashchenko et al. | |
| 8,320,091 B2 * | 11/2012 | Salcedo et al. | 361/56 |
| 2003/0011949 A1 * | 1/2003 | Ker et al. | 361/56 |
| 2003/0213995 A1 | 11/2003 | Duvvury et al. | |
| 2004/0027745 A1 * | 2/2004 | Kunz et al. | 361/56 |
| 2004/0212936 A1 | 10/2004 | Salling et al. | |
| 2006/0087781 A1 * | 4/2006 | Ishizuka et al. | 361/56 |
| 2008/0128816 A1 | 6/2008 | Lai | |
| 2009/0267154 A1 | 10/2009 | Boselli et al. | |
| 2010/0006890 A1 | 1/2010 | Wijmeersch | |
| 2011/0063765 A1 | 3/2011 | Boselli et al. | |
| 2011/0241731 A1 * | 10/2011 | Russ | 326/121 |

OTHER PUBLICATIONS

U.S. Appl. No. 13/437,475, filed Apr. 2, 2012. 19 Pages.
Office Action dated May 23, 2013 for U.S. Appl. No. 13/437,475.
Notice of Allowance dated Oct. 8, 2013 for U.S. Appl. No. 13/437,475. 24 Pages.

* cited by examiner

*Primary Examiner* — Danny Nguyen
(74) *Attorney, Agent, or Firm* — Eschweiler & Associates, LLC (57) ABSTRACT

Some embodiments relate to an electrostatic discharge (ESD) protection device to protect a circuit from an ESD event. The ESD protection device includes first and second trigger elements. Upon detecting an ESD pulse, the first trigger element provides a first trigger signal having a first pulse length. The second trigger element, upon detecting the ESD pulse, provides a second trigger signal having a second pulse length. The second pulse length is different from the first pulse length. A primary shunt shunts power of the ESD pulse away from the ESD susceptible circuit based on the first trigger signal. A current control element selectively pumps current due to the ESD pulse into a substrate of the primary shunt based on the second trigger signal.

24 Claims, 6 Drawing Sheets

SELECTIVE CURRENT PUMPING TO ENHANCE LOW-VOLTAGE ESD CLAMPING USING HIGH VOLTAGE DEVICES

BACKGROUND

An electrostatic discharge (ESD) pulse is a sudden and unexpected voltage and/or current discharge that transfers energy to an electronic device from an outside body, such as from a human body for example. ESD pulses can damage electronic devices, for example by "blowing out" a gate oxide of a transistor in cases of high voltage or by "melting" an active region area of a device in cases of high current, causing junction failure.

As will be appreciated in greater detail below, the present disclosure relates to improved ESD protection techniques.

DETAILED DESCRIPTION

The present invention will now be described with reference to the attached drawing figures, wherein like reference numerals are used to refer to like elements throughout, and wherein the illustrated structures and devices are not necessarily drawn to scale.

Figure 1:
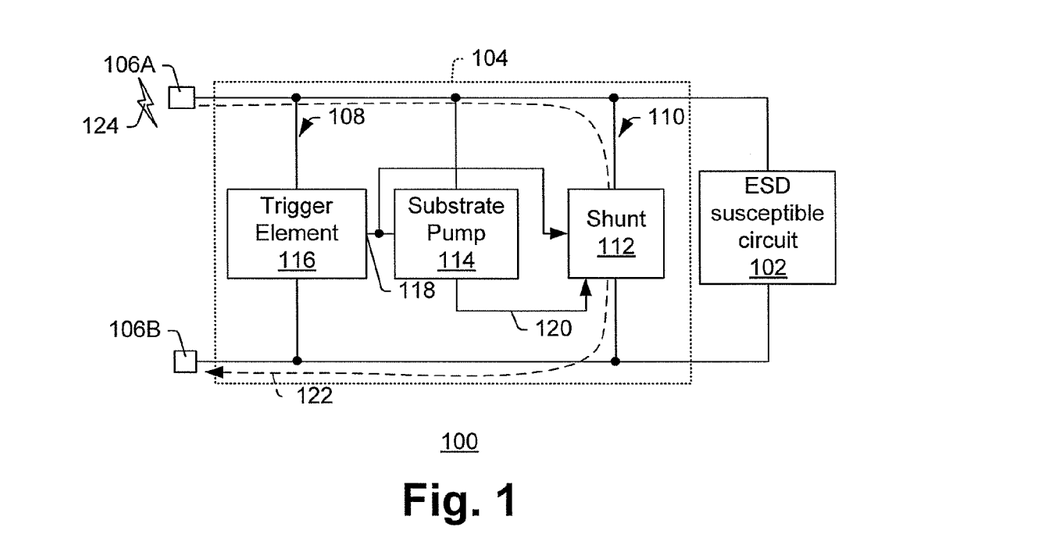
FIG. 1 shows an ESD protection device that suffers from some shortcomings.

FIG. 1 shows a circuit 100 that uses ESD protection techniques that are less than ideal. Circuit 100 includes ESD susceptible circuit 102 and ESD protection circuit 104, both of which are electrically coupled to first and second circuit nodes 106A, 106B (e.g., DC supply voltage pin and ground pin, respectively, of an integrated circuit.) ESD protection circuit 104 includes first and second electrical paths 108, 110 which extend in parallel between first and second circuit nodes 106A, 106B. First electrical path 108 includes trigger element 111 arranged thereon, and second electrical path 110 includes shunt 112. Substrate pump 114 is arranged to pump the substrate of shunt 112 to enhance its gain during ESD events.

During operation, trigger element 116 detects a voltage and/or current spike indicative of ESD pulse 124, and accordingly increases a voltage of a trigger signal at its output 118. This increased voltage puts shunt 112 and substrate pump 114 into conductive states. Substrate pump 114 thus diverts some current of ESD pulse 124 into the substrate of shunt 112 via path 120, which helps to increase the gain of shunt 112. Because of the high-voltage trigger signal, shunt 112 now represents a low-impedance (relative to ESD susceptible circuit 102) and power of ESD pulse 124 flows over shunt 112 and away from ESD susceptible circuit 102, as shown by arrow 122.

Although this technique is sufficient in some respects, ESD protection circuit 104 suffers from a shortcoming in that shunt 112 may be unable to adequately shunt large ESD pulses, particularly when low voltage devices are used for circuits 102 and 104. Thus, if a large ESD pulse is impingent, the rapid influx of ESD current may "swamp" shunt 112, such that some power from the ESD pulse may reach ESD susceptible circuit 102 and cause damage. Also, if too much current is channeled through shunt 112 per unit area, shunt 112 itself can also be damaged.

Therefore, aspects of the present disclosure relate to ESD protection techniques that still provide substrate pumping to increase gain of a shunt while also allowing increased current shunting relative to conventional approaches. Thus, these techniques provide a reliable protection against ESD pulses, thereby helping to achieve good manufacturing yields and reliable customer performance.

Figure 2:
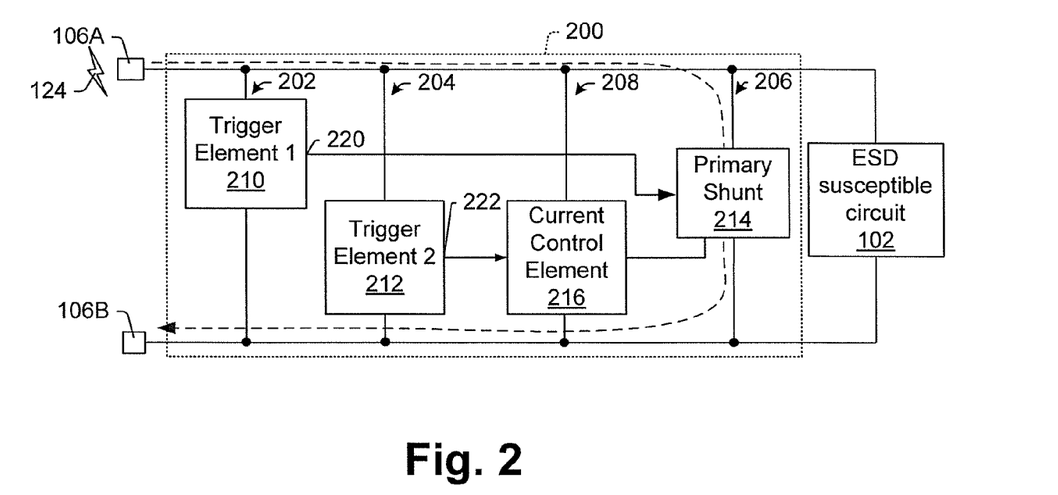
FIG. 2 shows an exemplary embodiment of an ESD protection device including a current control element.

FIG. 2 shows an exemplary ESD protection circuit 200. ESD protection circuit 200 includes first, second, third, and fourth electrical paths 202, 204, 206, 208, respectively, which extend in parallel between first and second circuit nodes 106A, 106B. First electrical path 202 includes first trigger element 210, second electrical path 204 includes second trigger element 212, and third electrical path 206 includes primary shunt 214. Fourth electrical path 208 includes current control element 216. During operation, a low-impedance state for primary shunt 214 is triggered by a first trigger signal from first trigger element 210. The current control element 216 is arranged to selectively act as a substrate pump for primary shunt 214 based on a second trigger signal from the second trigger element 212 and to selectively act as a secondary shunt in parallel with the primary shunt 214 based on the second trigger signal. The first and second trigger signals typically have different pulse lengths and/or have edges that are offset.

Figure 3:
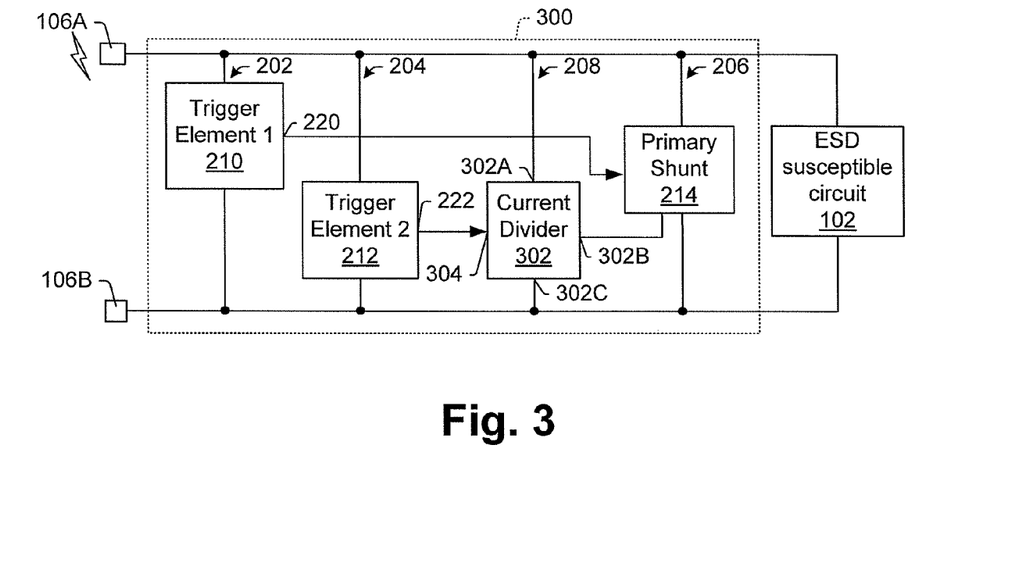
FIG. 3 shows an exemplary embodiment of an ESD protection device having a current control element implemented as a current divider.

In some embodiments, such as the exemplary embodiment shown in FIG. 3, the current control element (e.g., 216 in FIG. 2) can be implemented as a current divider 302 with an control terminal 304. When no ESD pulse is present, the first and second trigger elements 210, 212 are off, such that primary shunt 214 and current divider 302 both represent high impedance states between first and second circuit nodes 106A, 106B. Thus, normal operating power flows to the circuit 102 via first and second circuit nodes 106A, 106B in the absence of an ESD pulse. When an ESD pulse 124 is impingent, however, the first and second trigger elements 210, 212 activate first and second trigger signals, which in turn concurrently activate the primary shunt 214 and the current divider 302, respectively. In this state, the current divider 302 diverts ESD current flowing into terminal 302A out of 302B to pump substrate of primary shunt 214 (thereby increasing gain of primary shunt 214), and concurrently diverts ESD current flowing into terminal 302A out of 302C to act as a secondary shunt.

Figure 4:
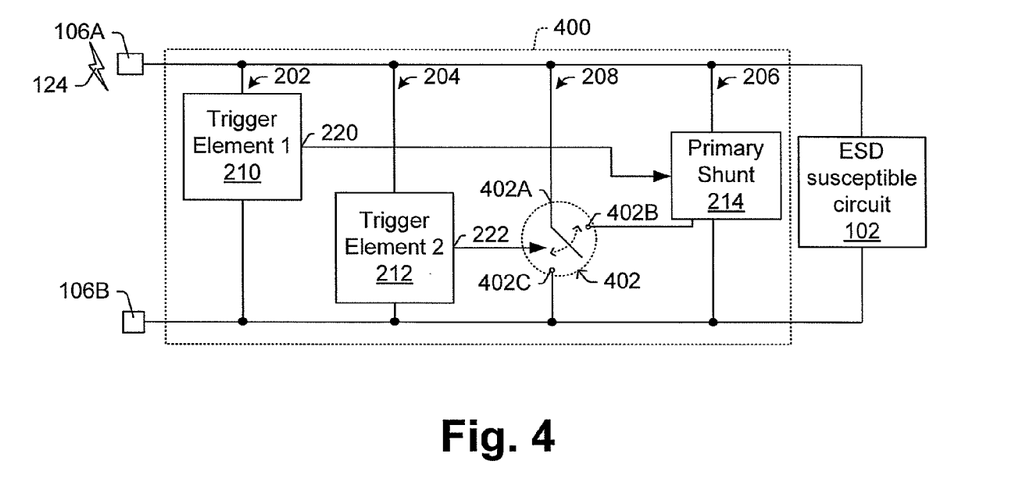
FIG. 4 shows an exemplary embodiment of an ESD protection device having a current control element implemented as a current switching element.

In other embodiments, such as the exemplary embodiment shown in FIG. 4, a current control element (e.g., 216 in FIG. 2) can be implemented as a current switch 402 that either acts as a substrate pump for the primary shunt 214 or acts as a secondary shunt at any given time, but does not act as both concurrently. When no ESD pulse is present, the first and second trigger elements 210, 212 are again off, such that primary shunt 214 represents a high impedance state and the current switch 402 is set to position 402B. Due to the high impedance when no ESD pulse is present, normal operating power flows to the circuit 102 via first and second circuit nodes 106A, 106B. When an ESD pulse 124 is impingent, however, the first trigger element 210 activates the primary shunt 214. For part of this impingent ESD pulse 124, the second trigger element 212 remains off such that the current switch 402 remains set to position 402B and thus pumps current due to the ESD pulse 124 into the substrate of primary shunt 214. At some later time in the ESD pulse, the second trigger element 212 is activated, and the current switch 402 changes its state to divert current to 402C, thereby acting as a secondary shunt that works in parallel with primary shunt 214 and ceasing substrate pumping of primary shunt 214.

Figure 5A:
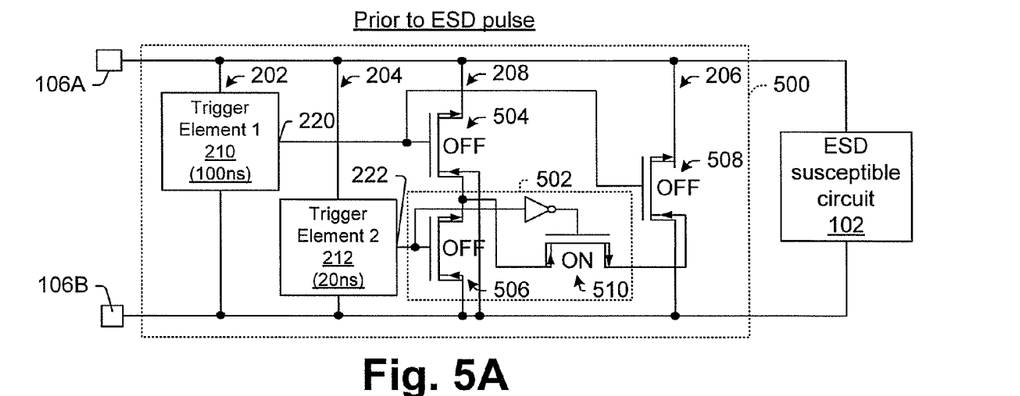
FIGS. 5A-5C show an exemplary embodiment of an ESD protection circuit including a current switching element as it protects against a ESD pulse having a pulse length of approximately 150 nanoseconds.
Figure 5B:
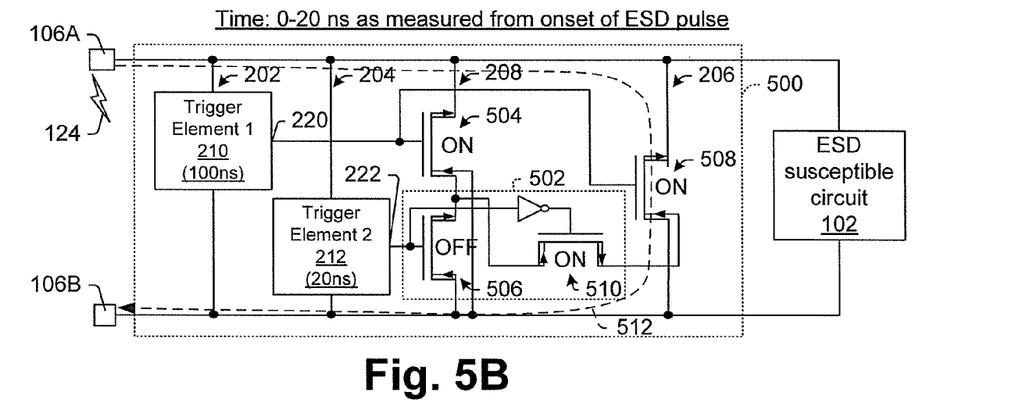
Figure 5C:
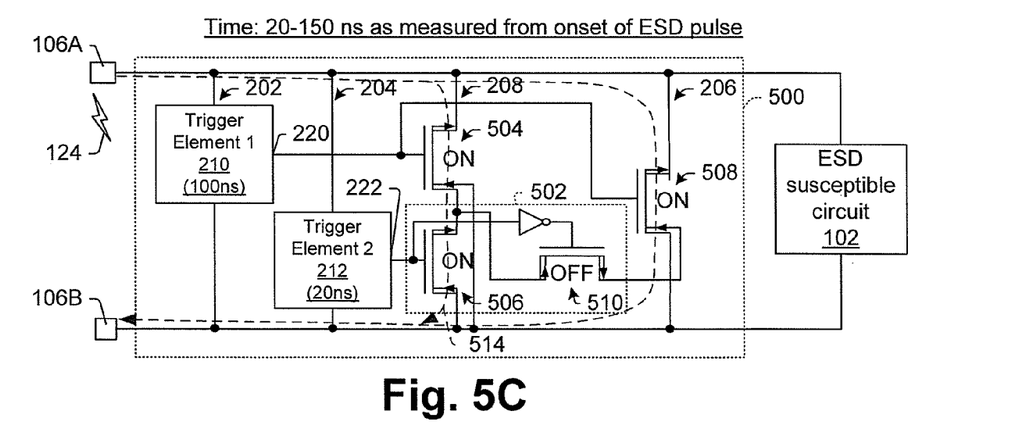

FIGS. 5A-5C illustrate an example where an ESD device 500 having a current switch 502 protects against an ESD pulse having a duration of about 150 ns. As shown in FIG. 5A, in the absence of an ESD pulse 124, the first and second trigger elements 210, 212 remain off and correspondingly provide low voltages at their respective outputs 220, 222. These low voltages, which are less than threshold voltages $V_{TH}$ of drain-extended MOS (DeMOS) transistors 504, 506, 508, leave DeMOS transistors 504, 506, 508 in non-conducting, high impedance states. Thus, as long as no ESD pulse is present, first through fourth paths 202-208 represent high-impedance states and normal operating voltages on first and second circuit nodes 106A, 106B flow substantially un-impeded to the ESD susceptible circuit 102. For example, if the first circuit node 106A carries a 5-volt DC supply voltage and the second circuit node 106B carries a 0-volt DC supply voltage, the ESD susceptible circuit 102 will see a 5V bias voltage in the absence of an ESD pulse 124.

FIG. 5B represents ESD protection circuit 500 shortly after ESD pulse 124 has been detected by first and second trigger elements 210, 212. In response to detection of ESD pulse 124, the first trigger element 210 asserts first trigger signal on first output 220. The first trigger signal, when asserted, has a voltage level that is higher than the respective threshold voltages of primary pump 504 (e.g., DeNMOS) and primary shunt 508 (e.g. DeNMOS). Thus, the first trigger signal puts primary pump 504 and primary shunt 508 into conductive states, which tends to shunt ESD current as shown by current path 512. For a first time interval when the first trigger signal is asserted, the second trigger signal remains de-asserted. Because of this, secondary pump 510 is conductive, and current due to ESD pulse is pumped into substrate of primary shunt 508 to increase its gain.

In FIG. 5C, at some later time in during the ESD pulse 124, the second trigger element 212 is activated, causing the second trigger signal on 222 to have a voltage level that is higher than the threshold voltage of secondary shunt 506. Thus, the second trigger signal puts secondary shunt 506 into a conductive state, and at the same turns off the secondary pump 510. Because secondary shunt 506 is now conductive, some ESD impingent current is also shunted through secondary shunt 506 as shown by current path 514. In this way, during a first portion of the ESD pulse when the second trigger signal is asserted (e.g., the first approximately 20 ns in this example), substrate pumping occurs (FIG. 5B), and during a second portion of the ESD pulse additional current shunting takes place (FIG. 5C).

Figure 6A:
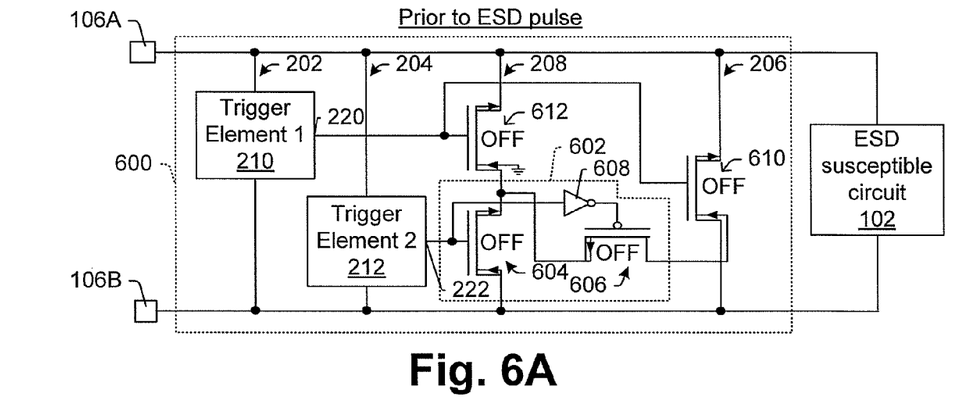
FIGS. 6A-6C show an exemplary embodiment of an ESD protection circuit including a current divider as it protects against an ESD pulse having a pulse length of approximately 150 nanoseconds.
Figure 6B:
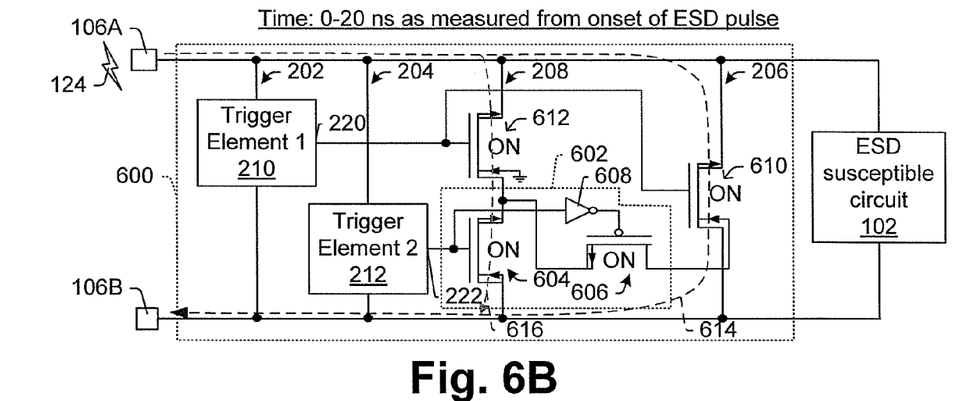
Figure 6C:
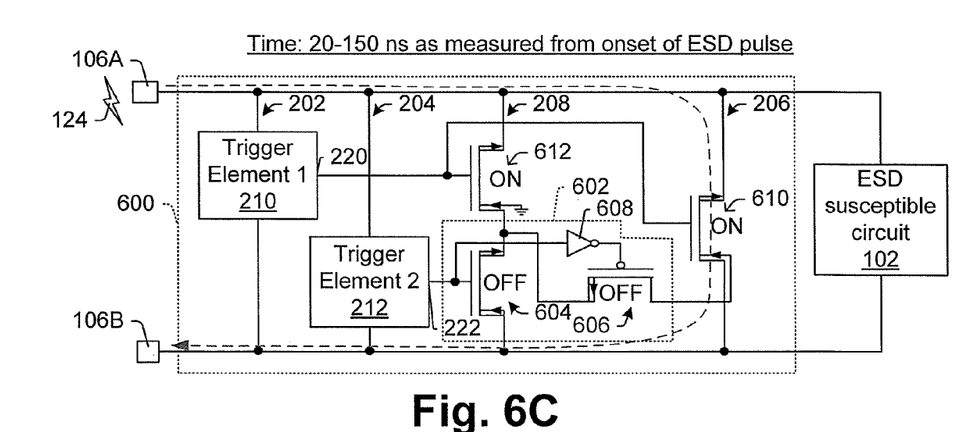

FIGS. 6A-6C show an ESD protection circuit 600 where current divider 602 (e.g., current divider 216 in FIG. 2) includes secondary shunt 604 (e.g., DeNMOS) and secondary pump 606 (e.g., DePMOS), which are operably coupled as shown. In FIG. 6A-6C, inverter 608 is also included in the current divider 602. However, it will be appreciated that in other embodiments, a DePMOS transistor (or other switching elements, such as MOSFETs, BJTs, etc.) could be substituted in secondary shunt 604 in place of the illustrated DeNMOS transistor, a DeNMOS transistor (or other switching elements, such as MOSFETs, BJTs, etc.) could be substituted in secondary pump 606 in place of DePMOS transistor, and inverter 608 need not be present in all embodiments. The same is true of the previous embodiment illustrated in FIGS. 5A-5C. An example where an ESD pulse 124 is impingent is now described below with regards to FIGS. 6A-6C.

FIG. 6A represents ESD protection circuit 600 prior to the onset of an ESD pulse. Because no ESD pulse is present, first and second trigger elements 210, 212 remain off and correspondingly provide low voltages at their respective outputs 220, 222. These low voltages, which are less than threshold voltages $V_{TH}$ of primary shunt 610 and primary pump 612, respectively, leave primary shunt 610 and primary pump 612 in non-conducting, high impedance states. Thus, as long as no ESD pulse is present, primary shunt 610 remains in a high-impedance ("off") state and normal operating voltages on first and second circuit nodes 106A, 106B flow substantially unimpeded to ESD susceptible circuit 102. For example, if first circuit node 106A carries a 5-volt DC supply voltage and second circuit node 106B carries a 0-volt DC supply voltage, ESD susceptible circuit 102 will see a 5V bias voltage in the absence of an ESD pulse.

FIG. 6B represents ESD protection circuit 600 shortly after ESD pulse 124 has been detected by first and second trigger elements 210, 212. In response to detection of ESD pulse 124, first and second trigger elements 210, 212 assert first and second trigger signals, respectively, on first and second outputs 220, 222, respectively. The first trigger signal at output 220, when asserted, has a voltage level that is higher than the respective threshold voltages of primary pump 612 (e.g., DeNMOS) and primary shunt 610 (e.g. DeNMOS). Thus, the first trigger signal puts primary pump 612 and primary shunt 610 into conductive states, which tends to shunt ESD current as shown by current path 614.

Similarly, the second trigger signal at output 222, when asserted by second trigger element 212, has a voltage level that is higher than the threshold voltages of secondary shunt 604, inverter 608, and the secondary pump 606. Thus, the second trigger signal puts secondary shunt 604 and secondary pump 606 into conductive states. In FIG. 6B, some impingent ESD current flows through primary pump 612 and secondary pump 606 into substrate of primary shunt 610, thereby increasing the gain of primary shunt 610 and aiding ESD current dissipation along current path 614. In addition, when secondary shunt 604 is also conductive, some ESD impingent current is also shunted through secondary shunt 604 as shown by current path 616. In this way, during a first portion of the ESD pulse when the second trigger signal is asserted (e.g., the first approximately 20 ns in this example), increased current dissipation is enabled relative to conventional approaches. For example, assuming equal size transistors, this embodiment can provide approximately 50% more current handling compared to conventional substrate pump proposals in some implementations.

The second trigger signal at output 222 often has a different pulse length than the first trigger signal at output 220. For example, the pulse length of the second trigger signal is often shorter than the first pulse signal length. In FIG. 6C's example (which represents 20-100 ns as measured from the onset of the ESD pulse), the second trigger signal at output 222 has been de-asserted in that its voltage level has now fallen below the threshold voltages of secondary shunt 604 and secondary pump 606. Therefore, for this second time period in the ESD pulse, secondary shunt 604 and secondary pump 606 are now "off". Therefore, current is no longer injected into the substrate of primary shunt 610 through secondary pump 606, and current is no longer shunted over secondary shunt 604 as previously illustrated in FIG. 6B. Nevertheless, the ESD current is conducted over the primary shunt element 610 during this time period.

Figure 7:
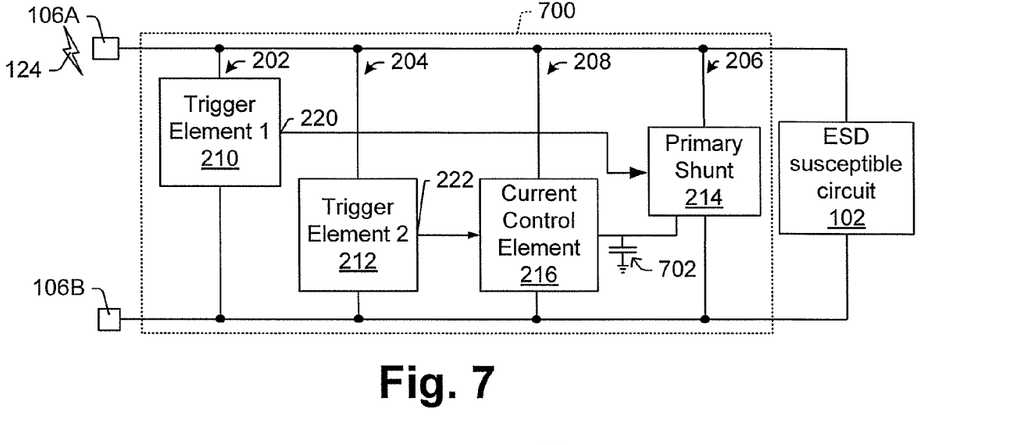
FIG. 7 shows an exemplary embodiment of an ESD protection circuit that includes an additional capacitor to promote substrate pumping.

FIG. 7 shows an exemplary illustration of an ESD protection circuit 700 where capacitor 702 has been added to help pump the substrate of primary shunt 214. The capacitor 702 can be a discrete, off-chip capacitor or an on-chip capacitor formed in adjacent metal or poly layers of the IC, for example. The capacitor 702 gets charged during the first 20 ns and will provide the pumping current even after the secondary trigger element has timed-out after 20 ns. In other words, it helps to store charge for pumping over a period of time and supplies charge to the primary pump.

Figure 8:
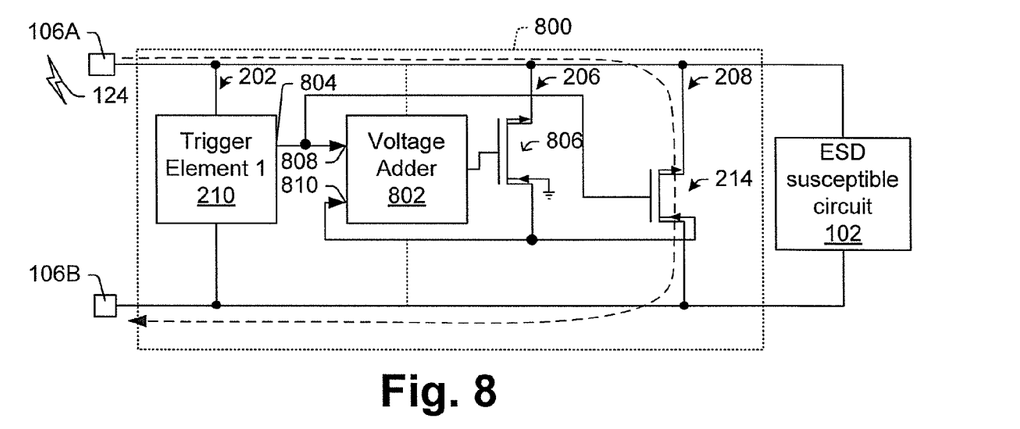
FIG. 8 shows an exemplary embodiment of an ESD protection device that includes a voltage adder.

FIG. 8 shows an exemplary embodiment of an ESD protection circuit 800 that makes use of a voltage adder 802. In some embodiments, the voltage adder 802 can be implemented as an op amp that adds two voltages on voltage adder inputs 808, 810, and which is coupled to the first and second circuit nodes 106A, 106B. The voltage adder 802 limits a voltage potential increase on both the substrate of primary shunt 214 and source of primary pump 806 due to resistance of the substrate. If left unresolved, this undesired potential build-up can cause biasing issues (e.g., too little biasing) for the primary pump transistor 806. To limit this voltage potential increase, during operation trigger element 210 asserts a trigger signal on 804 upon detecting a voltage or current spike indicative of an ESD pulse 124. To retain an approximately constant gate to source voltage, $V_{GS}$, for primary pump 806, the voltage adder 802 adds the voltages on voltage adder inputs 808, 810 to increase the adder output voltage provided to gate of primary pump 806. In this way, the output voltage of the voltage adder 802 acts as a stepped-up trigger signal which has a dynamic voltage level that maintains a substantially constant gate-to-source voltage for the pump transistor 806 throughout an impingent ESD pulse. In other words, the voltage adder 802 compensates any loss in current in the primary pump 806 as would be the case for increased source potential.

Figure 9:
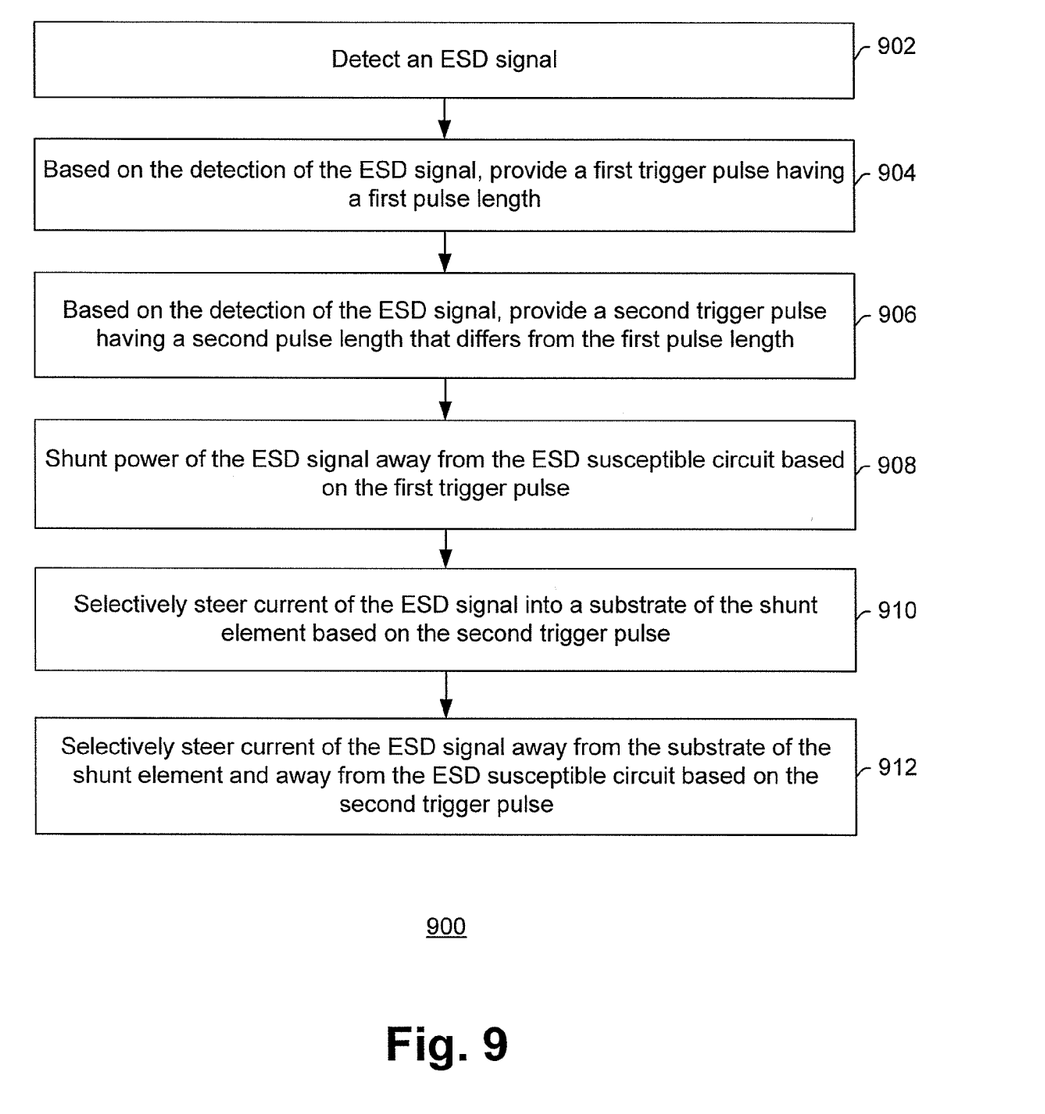
FIG. 9 shows a method in flowchart format in accordance with some embodiments.

FIG. 9 shows an exemplary method 900 for ESD protection in accordance with one aspect of the present disclosure.

At step 902, method 900 begins with first trigger element selectively activates a first trigger signal based on detection of the ESD pulse. For example, if an ESD pulse is detected, a voltage of the first trigger signal can be increased for approximately 100 ns to correspond to activation of the first trigger signal. The time for which the first trigger signal is asserted can depend on the size of the ESD pulse, and can vary widely depending on design constraints. Thus, the first trigger signal is in no way limited to a pulse length of 100 ns, but can be significantly longer or shorter depending on the implementation.

At step 904, method 900 continues for the second trigger element to selectively activate a second trigger signal based on detection of the ESD pulse. For example, if an ESD pulse is detected, a voltage of the second trigger signal can be increased for approximately 20 ns to correspond to activation of the second trigger signal. The time for which the second trigger signal is asserted can depend on the size of the ESD pulse, and can vary widely depending on design constraints. Thus, the second trigger pulse is in no way limited to a pulse length of 20 ns, but can be significantly longer or shorter depending on the implementation. The pulse length of the second trigger signal often differs from the first pulse length.

At step 906, the primary shunt shunts away the power of the ESD pulse from an ESD susceptible circuit based on the first trigger signal.

At step 908, the primary pump selectively pumps current due to the ESD pulse into a substrate of the primary shunt based on the second trigger signal.

At step 910, the secondary shunt shunts away power due to the ESD pulse from the ESD susceptible circuit based on the second trigger signal.

Although several embodiments have been described above with regards to the figures, it will be appreciated that nothing in this description or in these figures limit the scope of the present disclosure in any way. Other embodiments are also contemplated as falling within the scope of the present disclosure. For example, although the illustrated circuits can be implemented as an integrated circuit in some embodiments, they can also be implemented as a combination of discrete components in other embodiments. Further, although some embodiments may describe elements being coupled between first and second circuit nodes (e.g., 106A, 106B in FIG. 1-5), the second circuit node 106B can in some instances include a plurality of physically distinct nodes that are legally equivalent to a single second circuit node. For example, in FIG. 2's embodiment, the second circuit node can correspond to a single IC ground pin that is commonly coupled to first trigger element, second trigger element, shunt element, and current control element. However, in other embodiments, the first trigger element can be coupled to a first IC ground pin, the second trigger element can be coupled to a second IC ground pin that is physically distinct from the first IC ground pin, shunt element can be coupled to a third IC ground pin, and current divider can be coupled to a fourth IC ground pin.

Figure 10:
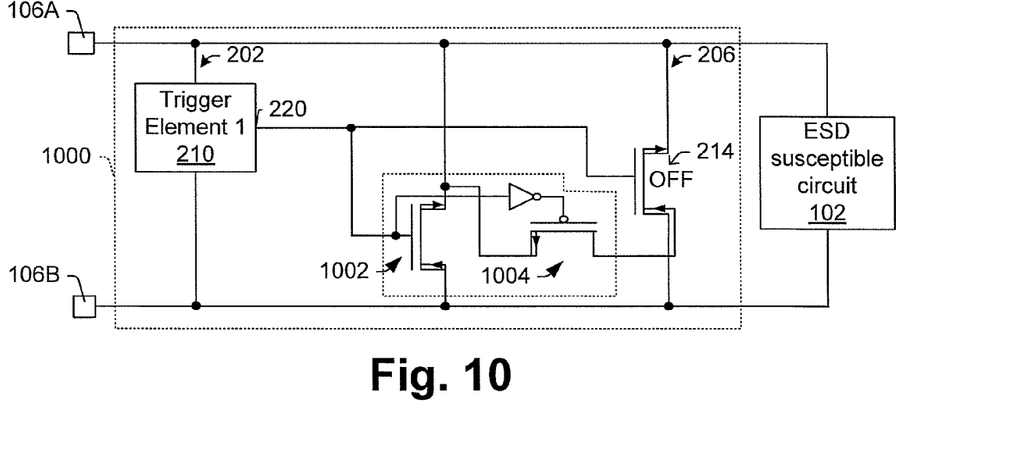
FIG. 10 shows an exemplary embodiment of an ESD protection device that includes a single trigger element.

Also, not all illustrated elements are required for all implementations. FIG. 10 shows an exemplary embodiment where only one trigger element is employed rather than first and second trigger elements. In this example, the substrate pump includes a DeNMOS 1002, and a DePMOS device 1004 that are operably coupled as shown. Selective current pumping is based on the first trigger signal only.

Thus it will be appreciated that some embodiments relate to an electrostatic discharge (ESD) protection device to protect an ESD susceptible circuit from an ESD pulse. The ESD protection device includes a first trigger element to, upon detecting an ESD pulse, provide a first trigger signal having a first pulse length. The ESD protection device also includes a second trigger element to, upon detecting the ESD pulse, provide a second trigger signal having a second pulse length different from the first pulse length. A shunt is adapted to, based on the first trigger signal, shunt power of the ESD pulse away from the ESD susceptible circuit. A current divider is adapted to, based on the second trigger signal, selectively pump current due to the ESD pulse into a substrate of the shunt.

Other embodiments relate to an ESD protection device to protect an ESD susceptible circuit, which is electrically connected to first and second circuit nodes, from an ESD event. The ESD protection device includes a first electrical path extending between the first and second circuit nodes and including a first trigger element arranged thereon. A second electrical path, which includes a second trigger element, extends between the first and second circuit nodes and is in parallel with the first electrical path. A third electrical path also extends between the first and second circuit nodes and is in parallel with the first and second electrical paths. The third electrical path includes a shunt to selectively shunt energy of the ESD event from the first circuit node to the second circuit node based on a first trigger signal from the first trigger element. A fourth electrical path extends between the first and second circuit nodes in parallel with the first and second electrical paths. The fourth electrical path includes a current divider to selectively shunt current from the first circuit node to the second circuit node based on a second trigger signal from the second trigger element.

Still other embodiments relate to an ESD protection circuit including a trigger element configured to assert a trigger signal when an ESD pulse is detected. A shunt element is arranged to shunt power of an impingent ESD pulse based on the trigger signal. A voltage adder provides a stepped-up trigger signal based on the trigger signal. A pump transistor provides a current to a substrate of the shunt based on the stepped-up trigger signal, wherein the stepped-up trigger signal has a dynamic voltage level to keep a gate-to-source voltage applied to the pump transistor substantially constant throughout the ESD pulse.

Another embodiment relates to a method for ESD protection. In the method, a first trigger signal is selectively asserted for first pulse length based on whether an ESD pulse is detected. A second trigger signal is selectively asserted for a second pulse length based on whether the ESD pulse is detected. The second pulse length differs from the first pulse length. Power of the ESD pulse is shunted away from an ESD susceptible circuit via a primary shunt based on the first trigger signal. Current due to the ESD pulse is selectively pumped into a substrate of the primary shunt based on the second trigger signal.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An ESD protection circuit comprising:
 a first trigger element configured to, upon detecting an ESD pulse, provide a first trigger signal;
 a second trigger element configured to, upon detecting the ESD pulse, provide a second trigger signal;
 a primary shunt element configured to, based on the first trigger signal, shunt power of the ESD pulse; and a current control element configured to, based on the second trigger signal, selectively pump current due to the ESD pulse into a substrate of the primary shunt element;
 wherein the current control element comprises a current switch configured to selectively pump current due to the ESD pulse into the substrate of the primary shunt element when the second trigger signal is de-asserted, and further configured to selectively shunt current when the second trigger signal is asserted.

2. The ESD protection circuit of claim 1, wherein a pulse length of the first trigger signal is different from a pulse length of the second trigger signal.

3. The ESD protection circuit of claim 1, wherein a pulse length of the first trigger signal is the same as a pulse length of the second trigger signal.

4. The ESD protection circuit of claim 1, further comprising: a primary pump in series with the current control element.

5. The ESD protection circuit of claim 4, wherein the primary pump comprises a drain-extended MOS (DeMOS) transistor having a gate coupled to an output of the first trigger element.

6. The ESD protection circuit of claim 1, wherein the current divider comprises:
 a secondary pump element having a control terminal coupled to an output of the second trigger element, wherein the secondary pump element is configured to selectively pump current due to the ESD pulse into the substrate of the primary shunt based on the second trigger signal.

7. The ESD protection circuit of claim 6, wherein the current divider further comprises:
 a secondary shunt element having a control terminal coupled to an output of the second trigger element, wherein the secondary shunt is configured to selectively shunt current due to the ESD pulse based on the second trigger signal.

8. The ESD protection circuit of claim 7, wherein the secondary pump element and secondary shunt element each comprise a drain extended MOS transistor.

9. The ESD protection circuit of claim 1, wherein the current divider and primary shunt element are configured to concurrently shunt current due to the ESD pulse based on the first and second trigger signals.

10. The ESD protection circuit of claim 1, wherein the primary shunt element comprises a drain-extended transistor.

11. An ESD protection circuit electrically connected to a first circuit node and a second circuit node comprising:
 a first electrical path extending between the first circuit node and the second circuit node and including a first trigger element;
 a second electrical path extending between the first circuit node and the second circuit node and including a second trigger element; and
 a third electrical path extending between the first and the second circuit node and arranged in parallel with the first and second electrical paths, the third electrical path including a primary shunt to selectively shunt energy of an ESD event from the first circuit node to the second circuit node based on a first trigger signal from the first trigger element; and
 a fourth electrical path extending between the first and second circuit nodes and arranged in parallel with the first and second electrical paths, the fourth electrical path including a current control element to selectively shunt current from the first circuit node to the second circuit node based on a second trigger signal from the second trigger element.

12. The ESD protection circuit of claim 11, wherein said/the current control element is further configured to selectively pump current into a substrate of the primary shunt based on the second trigger signal.

13. The ESD protection circuit of claim 11, wherein the fourth electrical path further comprises:
a primary pump transistor having a first source or drain coupled to the first circuit node and a second source or drain coupled to the current control element.

14. The ESD protection circuit of claim 13, wherein a control terminal of the primary pump transistor is coupled to an output of the first trigger element.

15. The ESD protection circuit of claim 13, wherein the current control element comprises:
a secondary shunt transistor having a first source or drain coupled to the second source or drain of the primary shunt and having a second source or drain coupled to the second circuit node.

16. The ESD protection circuit of claim 15, wherein the current control element is a current divider comprising:
a secondary pump transistor having a control terminal coupled to an output of the second trigger element, having a first source or drain coupled to the first source or drain of the secondary shunt transistor, and having a second source or drain coupled to a substrate of the primary shunt.

17. The ESD protection circuit of claim 16, further comprising a capacitor, wherein the capacitor has a first capacitor terminal coupled to the node coupling the secondary pump transistor to the substrate of the primary shunt and has a second capacitor terminal coupled to ground.

18. The ESD protection circuit of claim 11, wherein the ESD protection circuit protects an ESD susceptible circuit from an ESD pulse and the ESD susceptible circuit is designed to operate during normal operation at approximately 5 volts or more.

19. An ESD protection circuit comprising:
a trigger element configured to assert a trigger signal when an ESD pulse is detected;
a shunt to shunt power of the ESD pulse based on the trigger signal;
a voltage adder configured to provide a stepped-up trigger signal based on the trigger signal; and
a pump transistor to provide a current to a substrate of the shunt based on the stepped-up trigger signal, wherein the stepped-up trigger signal has a dynamic voltage level to keep a gate-to-source voltage applied to the pump transistor substantially constant throughout the ESD pulse.

20. A method for ESD protection, comprising:
asserting a first trigger signal for first pulse length upon an ESD pulse being detected;
asserting a second trigger signal for a second pulse length upon the ESD pulse being detected, the second pulse length differing from the first pulse length;
shunting power of the ESD pulse away from an ESD susceptible circuit by a primary shunt based on the first trigger signal; and
selectively pumping current due to the ESD pulse into a substrate of the primary shunt based on the second trigger signal; and
selectively shunting power of the ESD pulse away from said/the ESD susceptible circuit by a secondary shunt based on the second trigger signal.

21. The method of claim 20, wherein power of the ESD pulse is shunted away from the ESD susceptible circuit concurrently by the primary shunt and secondary shunt.

22. The method of claim 20, wherein the power of the ESD pulse is shunted away from the ESD susceptible circuit concurrently by the primary shunt and secondary shunt for the entire second pulse length and for less than the entire first pulse length.

23. The method of claim 20, wherein the primary shunt comprises a drain-extended MOS transistor.

24. An ESD protection circuit comprising:
a first trigger element configured to, upon detecting an ESD pulse, provide a first trigger signal;
a second trigger element configured to, upon detecting the ESD pulse, provide a second trigger signal;
a primary shunt element configured to, based on the first trigger signal, shunt power of the ESD pulse; and
a current control element configured to, based on the second trigger signal, selectively pump current due to the ESD pulse into a substrate of the primary shunt element;
wherein said/the current control element comprises a current divider configured to, based on the second trigger signal, selectively shunt current due to the ESD pulse.

* * * * *